Sept. 10, 1968 P. H. KAFITZ 3,401,355

STEP RECOVERY DIODE FREQUENCY MULTIPLIER

Filed Oct. 31, 1966 2 Sheets-Sheet 1

INVENTOR.
PETER H. KAFITZ

BY Carl R. Brown
Attorney

INVENTOR.
PETER H. KAFITZ

BY Carl R. Brown
Attorney

United States Patent Office 3,401,355

Patented Sept. 10, 1968

3,401,355

STEP RECOVERY DIODE FREQUENCY MULTIPLIER

Peter H. Kafitz, La Jolla, Calif., assignor to Ryan Aeronautical Co., San Diego, Calif.

Filed Oct. 31, 1966, Ser. No. 590,717
1 Claim. (Cl. 331—53)

ABSTRACT OF THE DISCLOSURE

A frequency multiplier employing a step recovery diode for providing continuous wave, higher harmonic, electromagnetic energy output in response to a continuous wave input signal and which step recovery diode is biased by a selectively variable bias to selectively vary the phase of the electro-magnetic energy output independently of the frequency and phase of the input signal.

A step recovery diode is particularly useful in a frequency multiplier because of the diode's capability of multiplying the input frequency. The process by which a step recovery diode converts power from one frequency to a harmonic of that frequency is well documented in the literature. Reference is made to Stewart M. Krakauer, "Harmonic Generation, Rectification, and Lifetime Evaluation With the Step Recovery Diode," proceedings I.R.E., volume 50, No. 7, pages 1665–1676, July 1962.

Basically, the step recovery diode is believed to operate as follows. During forward conduction, a semi-conductor diode stores charges in the form of minority carriers in the region of the junction. When the polarity of the voltage applied to the diode is reversed, this stored charge must be swept out before the diode ceases to conduct. Thus the diode is for a short initial period able to conduct with relatively low resistance and low impedance in the reverse direction. Then a very abrupt transition from a reverse storage condition to cutoff occurs. This causes a very rapid drop in the current magnitude flowing through the diode. Accordingly, if the voltage applied to the diode is suddenly reversed, the diode continues to conduct until the charge is depleted. Then the diode suddenly goes from a low to a high impedance. The step recovery diode thus functions as a very high speed switch and is simply a diode whose parameters have been optimized to make the transition from a stored charge condition to zero current take place very rapidly.

When a step recovery diode is used as a frequency multiplier, the step recovery diode is driven alternately into forward and reverse conduction states by the driving voltage. The transition from reverse storage condition to cut off, which occurs each negative half cycle, creates electromagnetic energy output that is rich in higher order harmonics of the driving frequency. These output bursts of the diode can be used to ring a very high Q tank circuit that selects the desired harmonic and supplies the output power between the bursts.

Known step recovery diode multipliers suffer from several limitations. One of these limitations is that the diode impedance in the forward or positive half cycle is low, in the order of a few ohms, while the diode when driven in the negative half cycle is reversed biased and its impedance is very high. This results in the need for a matching circuit between the driving circuit and the diode, which at best is a poor compromise circuit and maximum power is not transferred from the driving circuit to the diode. Also on the negative cycles, because of the lack of load, the voltage across the diode may swing into the region of reverse or zener breakdown. Such a breakdown can result in the generation of noise which appears as amplitude modulation of the multiplier output. Still further, the step recovery diode multipliers have a problem in suppressing unwanted harmonics. The snap action of the diode in the negative half cycle generates a signal that is rich in harmonics. This signal is produced having many inter-related output cycles which must be filtered with multi-stage filters, also the output of the step recovery diode multiplier can rapidly dissipate, giving little signal output between bursts. Also another limitation is the loss of power of the output frequency to the input circuit. The power generated in the snap action of the diode in the negative cycle can be reflected back into the source and this will cause a loss of power in the source. Still further the diode may react with the particular physical structure to vibrate in a manner to cause noise in the circuit.

Therefore it is an object of this invention to provide a new and improved step recovery diode frequency multiplier.

It is another object of this invention to provide a new and improved step recovery diode frequency multiplier having an impedance matching circuit to match the average impedance of the step recovery diode to the impedance of the driving circuit.

It is another object of this invention to provide a new and improved step recovery diode frequency multiplier in which there is energy storage means for storing the harmonic energy generated by the step recovery diode.

It is another object of this invention to provide a new and improved step recovery diode frequency multiplier in which the energy generated by the snap action of the step recovery diode is stored for use in an output circuit between negative half cycles of the input frequency.

It is another object of this invention to provide a new and improved step recovery diode frequency multiplier in which unwanted harmonics in the output frequency are prevented from contaminating the output.

It is another object of this invention to provide a new and improved step recovery diode frequency multiplier in which the output frequency may be selectively varied.

It is another object of this invention to provide a new and improved step recovery diode frequency multiplier in which the phase of the output signal may be selectively varied.

In accomplishing the foregoing objects of my invention, I use a step recovery diode to generate a harmonic signal output by using the diode capability of rapidly cutting off the current of an input signal from peak current to zero current. The step recovery diode is energized by an input alternating signal that is supplied through an impedance matching circuit that matches the impedance of the step recovery diode to the source of the alternating signal. The alternating signal is also supplied through a resonant circuit that tends to store energy at the input alternating signal frequency. The alternating signal when in the negative half cycle causes the step recovery diode to cut off the current flow in the reverse bias direction and generates an electromagnetic energy output that is rich in harmonics. An output circuit comprising a wave guide functions to provide a variable frequency output control means by selecting the output frequency from the many harmonics generated. This output circuit also stores energy at the output frequency so that a continuous output is provided at the increased frequency during the time period between the negative half cycles of the input alternating signal. The output circuit also matches the impedance of the step recovery diode with the output load.

A biasing circuit is provided for selectively adding positive or negative direct current bias to the input alternating signal and thus selectively positioning the point of current cutoff along the negative half cycle of the input signal. This allows through bias control, in a manner that will be more clearly explained later, for the exact positioning of the point of current cutoff at peak negative current. This optimizes the electromagnetic energy output generated by the step recovery diode. In addition by varying the positions of current cutoff, the phase of the output signal is selectively varied relative to the input signal. This phase change is multiplied in the frequency multiplication of the step recovery diode and thus the phase change obtained can be quite large. Further this large phase change can be obtained with relatively little reduction in the magnitude of the output energy and may be used to phase modulate the output signal which may have many applications, such as for use in phase modulated communication systems, phase lock loop applications as in a transmitter or receiver and for many other purposes.

It will be apparent to those skilled in the art that my invention has many other advantages, applications and novel features which will become more apparent in reading the following detailed description and viewing the drawing in which.

Figure 1:
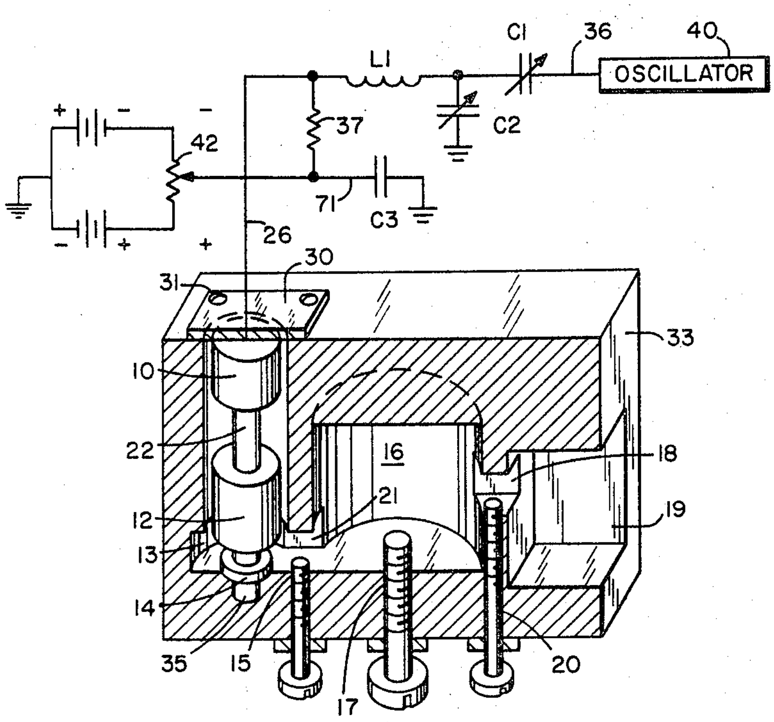
FIGURE 1 is a view of an embodiment of my invention that is partly in cross section and in perspective and partly in schematic and that shows portions of the electrical circuit with the wave guide structure for mounting the step recovery diode in partial cross section.

Referring now to FIGURE 1 in the drawings, an input signal from a known state of the art oscillator signal generator or the like 40 provides an alternating input signal, such as a sine wave having a frequency of, for example, from 100 to 800 megacycles and a power from 100 milliwatts to 10 watts. It should be recognized that the input signal is not limited to the above stated frequencies or power requirements. Rather the frequency and power ranges given are merely illustrative of those frequency and power ranges that can be used. The input alternating signal is centered around ground with positive and negative peak voltages. Variable capacitors $C_1$ and $C_2$ and choke $L_1$ in line 36 comprise an LC tank circuit that is tuned and matched to the incoming signal. As will become more apparent hereafter, the total resistances of the impedance matching structure 10, 12, and 22 and the resistance of the step recovery diode 14 constitute a resistance in the tuned tank circuit of capacitors $C_1$ and $C_2$ and choke $L_1$.

Figure 6:
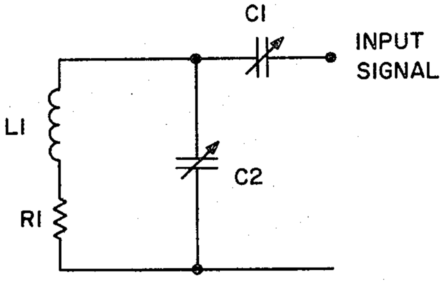
FIGURE 6 is an illustration of an equivalent circuit of the overall apparatus.

The input matching tank circuit, as seen by the input signal, is essentially as shown in FIGURE 6. Capacitor $C_1$ and $C_2$ and inductance $L_1$ constitute the tank circuit that is tuned and matched to the incoming signal. The resistance $R_1$ is the combined resistances of the step recovery diode and the bias resistance. The equivalent circuit in FIGURE 6 illustrates that it is possible to achieve an excellent match from the input source, that may for example be in the order of 50 ohms, to the low impedance of the step recovery diode. The high Q tank circuit illustrated in FIGURE 6 provides good energy storage of the incoming signal and the circuit is easily adjusted and can be made non-microphonic by foaming or potting the components.

A biasing circuit is connected to the input circuit line 26 through isolating resistor 37 and bypass capacitor $C_3$. The source of bias comprises positive and negative potential sources connected across a relatively low resistance potentiometer 42. By adjusting the output of poteniometer 42, it is possible to provide bias to line 71 having selective potential magnitude between zero and positive and negative potentials. The bias resistor 37 constitutes a small loss of power since it is shunted by the low impedance of diode 14. An RF choke can be substituted for the resistor, however a reactive element adds one more resonant circuit that may be excited by the sharp waveform generated by the step recovery diode 14.

The input line 26 to the step recovery diode 14 includes two metal cylinders 10 and 12 and an intermediate conductor 22, all of which form a diode holder. The cylinders may be made of brass or from other similar and suitable materials. The actual size of the cylinders may be, for example, approximately ¼ inch in diameter and ⅛ inch long and are wrapped with a thin layer of Teflon tape. The cylinders are a quarter wave length in length at the output frequency and are separated by a small diameter section 22 that is also a quarter wave length long.

To the output frequency the diode holder appears as alternate quarter wave length sections of a high and low impedance coaxial transmission line or effectively as a choke. To the step recovery diode 14, the impedance of the diode holder structure essentially zero and thus no RF energy at the output frequency escapes from the input line. It is possible to use just one of the cylinders, in which case the impedance would be a fraction in which the practically zero impedance of the cylinder is the numerator and the finite impedance at conductor 26 is the denominator. This would, for most applications, provide a sufficiently low impedance at the step recovery diode.

The wave guide structure 33 may be made of a conducting metal such as aluminum or the like or the structure can, if desired, be made of a plastic or other suitable material having a conducting metal coating. The holding structure functiones to hold the step recovery diode sufficiently rigid to prevent mechanical vibration by the diode 14. A plate 30 that is rigidly fastened to the wave guide structure 33 by screws 31, presses down against cylinder 10 and thus forces the structure and the step recovery diode 14 into a compressed physical structure that rigidly holds the diode 14 into recess 35 and from physical movement. A spring (not shown) may be placed between plate 30 and the top of cylinder 10 to hold the diode 14 as previously described and still provide spacing adjustment between plate 30 and the cylinder 10.

Figure 4:
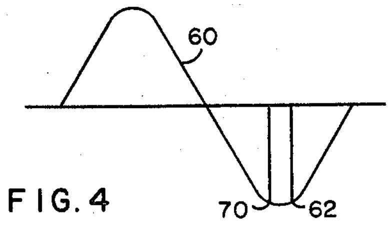
FIGURE 4 is a diagrammatic representation of the input alternating signal.

When the input alternating signal is fed through line 26, the signal passes through cylinders 10 and 12 and conductor 22 to the step recovery diode 14. The signal flowing to the step recovery diode 14 has the alternating positive and negative waveform 60 as shown in FIGURE 4. The diode 14 during the positive half cycle conducts in the forward conducting condition. During the negative half cycle or the reverse conducting condition, the diode opposes reverse current flow, but this condition does not occur instantaneously. Rather there is a delay and this delay permits the step recovery diode to function as a high speed switch. Basically if voltage is applied to the step recovery diode in the forward direction, then a charge, in the form of minority carriers, is stored in the region of the junction. In this condition, the diode 14 has a low impedance in the reverse conducting condition. If the voltage applied to the diode is suddenly reversed, then the diode 14 continues to conduct while the stored charge of minority carriers is swept out. When the charge is depleted, the diode suddenly goes from low to high impedance. The step recovery diode thus makes the transition from stored charge condition to zero current very rapidly. It has been found that this occurs in approximately 100 pico-seconds. This sudden interruption of reverse current flow is called the snap action of the step recovery diode.

Figure 5:
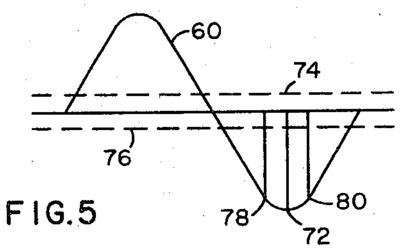
FIGURE 5 is a diagrammatic representation of the input alternating signal with bias control.

It is desirable to obtain maximum output from the snap action of the step recovery diode by having the point of snap occur at peak negative voltage or at point 72 on wave form 60. However, the particular point of snap of the diode depends on the total minority carriers stored by a particular step recovery diode and because of variations in diodes this point usually occurs at a point on the waveform other than at peak negative voltage. Thus the biasing current from the previously described biasing circuit is used to move the snap point to the point of peak negative voltage. As illustrated in FIGURE 5 the biasing current 74 and 76 can be positive or negative and have selective magnitudes. The positive biasing current 74 causes the waveform 60 to cross over from positive to negative at an earlier point. Thus if the normal point of snap of a given diode 14 is at point 80 on waveform 60, then a positive biasing current 74 will move the snap point back to point 72, the desired point of peak negative voltage. Should the snap point of diode 14 normally occur early at point 78, then a negative bias 76 will advance the snap point to point 72. Thus it may be seen that by biasing the input circuit it is possible to selectively adjust the snap point of the step recovery diode 14 to the desired point 72 of peak negative voltage. This permits the step recovery diode to snap at a point that provides peak output.

The rapid change of current magnitude in the step recovery diode creates electromagnetic wave energy in the wave guide cavity 13 in which it is mounted. Cavity 13 forms a small resonant cavity 13. While no means for tuning this cavity is provided, the Q of the cavity is comparatively low and therefore it is broad band. The diode cavity 13 is coupled to the high Q main cavity 16 through an iris 21. The coupling through iris 21 is adjustable by means of an adjustable capactive post 15 in the center of the iris. The main resonator or cavity 16 is tunable over a narrow range by a center post 17. Output is taken from the main cavity by a second iris 18 coupled to a wave guide 19. The output coupling is adjustable by an iris screw 20 placed in its center.

Figure 2:
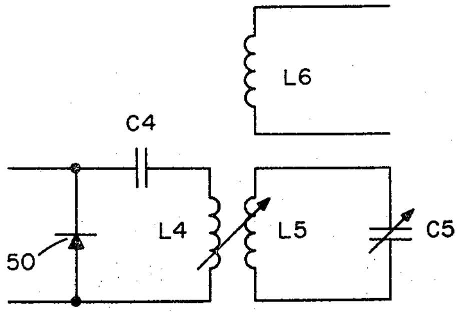
FIGURE 2 is a schematic diagram of the equivalent circuit of the wave guide embodiment disclosed in FIGURE 1.
Figure 3:
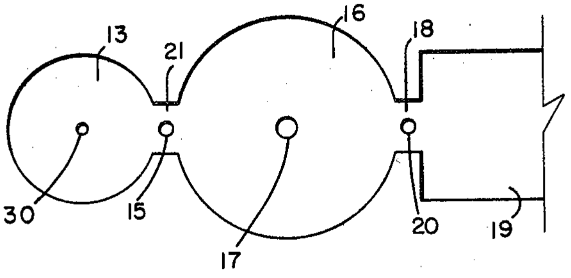
FIGURE 3 is a sechematic view of the openings and cavities in the wave guide of FIGURE 1.

The cavity structures 13, 16 and 19 form a variable frequency output control means that is represented by the equivalent circuit shown in FIGURE 2. The cavity 13 is represented in the equivalent circuit as the resonant circuit having capacitor C4 and inductance L4. The resonant circuit of cavity 13 is coupled with the resonant circuit of the cavity 16 that is represented in the equivalent circuit (FIGURE 2) by the inductance $L_5$ and capacitance $C_5$. The coupling between these two resonant circuits of cavities 13 and 16 may be varied by post 15. The output wave guide cavity 19 is represented by the inductance $L_6$ and the coupling between cavity 16 and the output wave guide cavity 19 is varied by post 20. Cavity 16 is the resonator or filter for selecting the desired harmonic or frequency output. Adjustment of post 17 tunes the filter to the desired frequency output. Posts 15 and 20 are adjustable to optimize the high Q tank necessary for the step recovery diode output and thus function to adjust the couplings. The tank circuit acts as the energy storage for the cyclic electromagnetic energy output of the step recovery diode and also acts as a filter or resonator to select the desired harmonic and thus the particular output frequency.

It should be recognized that by adjusting the bias through line 71 to the input tank circuit, it is possible to selectively change the time or phase of the output frequency from the cavity 16 of the wave guide. While the desired magnitude of the output signal from wave guide 19 limits the degree to which the bias can be effectively used to move the point of snap by the step recovery diode, the bias can, within acceptable limits, be used to selectively position the snap point over a range of approximately 45 degrees or 22½ degrees on either side of the peak of the input negative half cycle. This change in time and phase resulting from a change in the time or point of snap of the step recovery diode relative to the timing or phase of the input signal is multiplied in the output frequency. Thus a wide controlled phase change in the output signal is accomplished by varying the bias and thus the snap point of the diode relative to the input signal.

In operation, a sine wave is supplied by an oscillator 40 to the resonant circuit formed by variable capacitors $C_1$ and $C_2$ and choke $L_1$. The input sine wave is fed through line 26, through a diode holding structure including cylinders 10 and 12 to the step recovery diode 14. As the sine wave passes through its negative half cycle the step recovery diode 14 snaps at some point cutting off the current in the negative half cycle. Electromagnetic energy is generated by this snap action of the diode 14 which is supplied from cavity 13 through iris 21 to cavity 16 and through iris 18 to the output wave guide 19 for use. The bias to the input signal is adjusted to either a desired maximum interruption of the current of the input signal or is selectively adjusted by any known means of varying the bias to provide phase change in the output frequency signal from wave guide 19. The post 17 in cavity 16 is selectively adjusted to obtain a high Q resonant filter circuit and the particularly desired output frequency.

While it is expected that many modifications and changes in my invention will be possible by those skilled in the art upon reading my application, I do not desire to be limited to any theory of operation in connection with my invention or be limited to any application or use for my invention other than that defined in the claim.

Having thus disclosed my invention, I claim:

1. A step recovery diode frequency multiplier comprising, source means for providing a continuous wave input signal having alternating positive and negative half cycles, step recovery diode means being responsive to said input signal for providing a continuous wave output that is rich in higher order harmonics, variable frequency output control means for selectively eliminating unwanted frequencies of lower order harmonics in said output and providing a continuous wave output, selectively variable bias means for selectively varying the bias to said step recovery diode means and controllably varying the phase of said continuous wave output relative to said input signal, said diode means cuts off reverse current flow at a time interval following the start of said negative half cycles of said input signal, said variable bias means mixes direct current bias with said input signal and selectively varies the time of said negative half cycles thereby varying the phase of said continuous wave output signal relative to said input signal without varying the frequency or phase of said input signal, said diode means is rigidly mounted in a wave guide cavity and said output is high frequency electromagnetic energy, said output control means comprises a high Q resonant tunable cavity, said tunable cavity is connected to said wave guide cavity by a first tunable iris, and said tunable cavity is connected to an output wave guide cavity through a second tunable iris.

References Cited

UNITED STATES PATENTS

| | | | |
|---|---|---|---|
| 2,408,420 | 10/1946 | Ginzton | 321—60 X |
| 3,286,156 | 11/1966 | Barkes | 321—69 |
| 3,307,117 | 2/1967 | Williams | 331—76 X |
| 3,311,812 | 3/1967 | Geiszler et al. | 331—76 X |

OTHER REFERENCES

C. J. Beanland, "Semiconductor Sources—What Are the Main Design Features?," Electronic Design, Sept. 27, 1965, pp. 36, 37, 331–76.

Micronotes, vol. 1, No. 1, May 1963, pp. 1–7, Published by Microwave Associates, Inc.

ROY LAKE, *Primary Examiner.*

SIEGFRIED H. GRIMM, *Examiner.*